United States Patent [19]
Tanaka

[11] Patent Number: 6,137,633
[45] Date of Patent: Oct. 24, 2000

[54] LASER IRRADIATING APPARATUS AND LASER IRRADIATING METHOD

[75] Inventor: Koichiro Tanaka, Kanagawa, Japan

[73] Assignee: Semiconductor Energy Laboratory Co., Ltd., Japan

[21] Appl. No.: 09/062,876

[22] Filed: Apr. 20, 1998

[30] Foreign Application Priority Data

Apr. 21, 1997 [JP] Japan ................................. 9-118888

[51] Int. Cl.$^7$ .................................................. G02B 27/10
[52] U.S. Cl. .......................................... 359/619; 359/623
[58] Field of Search .................................. 359/619, 621, 359/622, 623, 626

[56] References Cited

U.S. PATENT DOCUMENTS

| | | | |
|---|---|---|---|
| 4,733,944 | 3/1988 | Fahlen et al. | 359/624 |
| 5,561,081 | 10/1996 | Takenouchi et al. | 437/174 |
| 5,657,138 | 8/1997 | Lewis et al. | 359/15 |
| 5,721,416 | 2/1998 | Burghardt et al. | 219/121.73 |
| 5,897,799 | 4/1999 | Yamazaki et al. | 219/121.75 |
| 5,900,980 | 5/1999 | Yamazaki et al. | 359/619 |
| 5,959,779 | 9/1999 | Yamazaki et al. | 359/624 |
| 5,968,383 | 10/1999 | Yamazaki et al. | 219/121.75 |

FOREIGN PATENT DOCUMENTS

| | | |
|---|---|---|
| 6-244104 | 9/1994 | Japan. |
| 7-61781 | 3/1997 | Japan. |

*Primary Examiner*—Georgia Epps
*Assistant Examiner*—Ricky Mack
*Attorney, Agent, or Firm*—Fish & Richardson P.C.

[57] ABSTRACT

In a laser irradiating method, the distribution of an energy within a laser beam is unified using an optical system including: a cylindrical lens group 202 including a plurality of constituent lenses each having a width W for dividing a light into $N(n-1)$ sections along a width direction of the beam; a parallelogram cylindrical lens group 501 having substantially an angle X defined by $|\tan X|=W/(d/(n-1))$ for dividing the light into $(2n+1)$ sections along a longitudinal direction of the beam; a parallelogram cylindrical lens 502 having substantially the angle X defined by $|\tan X|=W/(d/(n-1))$ for re-coupling the lights divided along the longitudinal direction; and a cylindrical lens 204 for re-coupling the lights divided along the width direction; wherein the d is defined as an interval of the peaks of interference stripes formed on a plane on which the beam is irradiated which passes through one constituent lens constituting the cylindrical lens group 202 that divides the light in the width direction.

19 Claims, 13 Drawing Sheets

LASER IRRADIATING APPARATUS AND LASER IRRADIATING METHOD

BACKGROUND OF THE INVENTION

1. Field of the Invention

The present invention relates to a technique by which a laser beam can be irradiated on a large area with a high uniformity, and also to its applied method.

2. Description of the Related Art

In recent years, there has been widely studied a technique by which an amorphous semiconductor film or a crystalline semiconductor film (a semiconductor film having crystallinity such as polycrystal or microcrystal of non-single crystal) formed on an insulating substrate made of glass or the like is crystallized or improved in crystallinity by conducting a laser annealing. A silicon film is frequently used for the semiconductor film.

The glass substrate is inexpensive and rich in processing property, in comparison with a quartz substrate which has been conventionally frequently used, as a result of which it is advantageous in that a large-area substrate can be readily fabricated. This is a reason why the above study has been made. Also, the reason why the layer is frequently used for crystallization is that a melting point of the glass substrate is low. The laser can give a high energy to only the non-single crystal film without largely changing the temperature of the substrate.

Because a crystalline silicon film formed by laser annealing is high in mobility, it is extensively utilized for a monolithic liquid crystal electro-optic device, etc., where a thin film transistor (TFT) is formed using the crystalline silicon film, for example, to fabricate TFTs for pixel and a drive circuit on a single glass substrate. Because the crystalline silicon film is made of a large number of crystal grains, it is called "polycrystal silicon film" or "polycrystal semiconductor film".

Also, a method in which a pulse laser beam having a large output such as excimer laser or the like is processed through an optical system so as to form a square spot of several cm square or a line of several mm width x several 10 cm on a plane to be irradiated, and the laser beam is scanned (while a position to which the laser beam is irradiated is moved relatively with respect to the plane to be irradiated) to conduct laser annealing has been frequently used because it is high in productivity and excellent from the industrial viewpoint.

In particular, the use of the linear laser beam is different from the use of a spot-like laser beam requiring scanning in the front and rear direction and in the right and left direction in that the laser can be irradiated on the entire plane to be irradiated by scanning only in a direction (width direction) perpendicular to the linear direction (longitudinal direction) of the linear laser, the high productivity can be obtained. The reason that scanning is made in the direction perpendicular to the linear direction is because it is the scanning direction where the coefficient is the highest. Because of the high productivity, the linear laser beam is being mainly used for laser annealing at present.

However, there arise some problems when laser annealing is conducted on the non-single crystal semiconductor film while scanning a pulse laser beam which has been processed into a line. In particular, one of the severe problems is that laser annealing is not uniformly conducted on the entire film surface. When the linear laser started to be used, a phenomenon that stripes are produced on portions where the adjacent beams are overlapped with each other was remarkable, and the semiconductor characteristic of the film was largely different depending on each of the stripes.

What is shown in FIG. 1A is a state of the stripes. The stripes are exhibited by the amount of reflection of a light when the surface of the silicon film after being annealed by a laser is observed.

In case of FIG. 1A, KrF excimer laser is used as a linear laser beam that extends in the right and left direction of a paper surface, and is irradiated while being scanned from the upper of the paper toward the lower thereof.

It is understood that the lateral stripes of FIG. 1A is caused by the overlapped degree of the pulse laser shots.

In the case of fabricating the active matrix liquid crystal display device using a silicon film exhibiting the stripped pattern shown in FIG. 1A there occurs a disadvantage that the stripes appear as they are.

This problem is being improved by improving the non-single crystal semiconductor film which is an object onto which a laser is irradiated, or thinning the scanning pitches (intervals between the adjacent linear laser beams) of the linear laser.

However, subsequent to the solving of the problem caused by the overlapped pulse laser shots, the nonuniformity of the energy distribution of the beam per se has been remarkable.

In general, in the case of forming the linear laser beam, an original rectangular beam is processed into a line through an appropriate optical system. The original rectangular beam is about 2 to 5 in aspect ratio, and for example, the original beam is deformed into a linear beam 100 or more in aspect ratio through an optical system shown in FIG. 2. The optical system is designed so as to unify the distribution within the beam of energy at the same time.

The device shown in FIG. 2 has a function to irradiate a laser beam emitted from an oscillator 201 (which is in the form of substantially a square in this state) as linear beams through an optical system indicated by reference numerals 202, 203, 204, 205 and 207. Reference numeral 206 denotes a mirror.

What is denoted by reference numeral 203 is called "a cylindrical lens group" (which is also called "a multiple cylindrical lens" or "a flyeye lens") and has a function to divide the beams into a large number of beams. The large number of beams as divided is re-synthesized by the cylindrical lens 205.

This structure is required to improve the distribution of intensity within the beam. Also, the combination of the cylindrical lens group 202 with the cylindrical lens 204 has the same function as the above-described combination of the cylindrical lens group 203 with the cylindrical lens 205.

In other words, the combination of the cylindrical lens group 203 with the cylindrical lens 205 has a function to improve the distribution of intensity of the linear laser beam in its longitudinal direction, and the combination of the cylindrical lens group 202 with the cylindrical lens 204 has a function to improve the distribution of intensity of the linear laser beam in its width direction.

The optical system designed to unify the distribution of an energy within the beam is called "a beam homogenizer". The optical system shown in FIG. 2 is also one of the beam homogenizers. The method of unifying the distribution of an energy is that after the original rectangular beam is divided, the respective divided beams are enlarged and superimposed on each other to unify the distribution of an energy.

Seemingly, in the beam which is divided and re-constructed in the above method, the distribution of the energy becomes uniform more as the division of the beam becomes more fine. However, in fact, when the beam is irradiated onto the semiconductor film, the stripped pattern shown in FIG. 1B appears regardless of the fineness of the division.

The irradiation of a laser onto a silicon film shown in FIG. 1B is also an example in which a linear KrF excimer laser beam extending in the right and left direction on the paper is scanned from the upper of the paper toward the lower thereof for irradiation as in the case of FIG. 1A. Here, the laser was irradiated under the scanning conditions where the stripes caused by the overlapping of the laser shot shown in FIG. 1A are not remarkably exhibited.

The stripped patterns are innumerably formed so as to be orthogonal to the longitudinal direction of the linear laser beam. The formation of such stripped pattern is caused by the stripped distribution of the energy of the original rectangular beam or optical system.

SUMMARY OF THE INVENTION

The present invention has been made to solve the above problems with the prior art, and therefore an object of the present invention is to improve the unevenness of irradiation of a laser beam shown in FIG. 1B.

In a process until the present inventors has attained the present invention, the present inventor has conducted a simple experiment to make sure of the cause why the above-described stripes are formed. That experiment is to investigate how the above vertical stripes are changed by rotating the laser beam before the rectangular laser beam is made incident to the optical system.

As a result of the experiment, the vertical stripes are not changed at all. It has been found that the formation of the stripped pattern is made by not the original rectangular beam but the optical system. It can be explained that since this optical system is designed to divide and re-couple the beam which has a single waveform and is in phase (since the laser obtains the intensity by making the phase coincide with each other, the laser beam is in phase) to unify the distribution of the energy, the stripes are the interference stripes of a light.

An appearance 302 of the optical interference stripes within a linear laser beam 301 formed through the optical system of FIG. 2 is shown in FIG. 3. In the figure, Symbol I denotes a laser intensity. The occurrence of such interference stripes results from the fact that when a plurality of beams into which the original beam has been divided by the cylindrical lens groups 202 and 203 of the optical system shown in FIG. 2 are synthesized by the cylindrical lenses 204 and 205, the divided beams are interfered with each other (refer to Japanese Patent Application Serial No. Hei 9-115275).

In other words, that the laser beams divided once are overlapped with each other on the same region of a plane to be irradiated causes sharp interference peaks to periodically occur.

In FIG. 3, the laser intensity is periodically changed. In the case of using the optical system of FIG. 2, three waves of the laser beam are formed in the longitudinal direction of the linear beam in one period as shown in FIG. 3.

The number n of the waves (the number of interference peaks) and the number s of lenses in the cylindrical lens group 203 satisfy the following relational expressions:

n=(s−1)/2 (s is an odd number)

n=s/2 (s is an even number)

In case of the optical system shown in FIG. 2, since the number of lenses of the cylindrical lens group 203 is s=7 (add number), n=3.

In this case, an interference state shown in FIG. 4A is obtained. What is shown in FIG. 4A is the simulation calculated by a computer. In fact, the square of a value in the ordinate axis shown in FIG. 4A corresponds to the intensity of light in the interference state.

For example, the interference state of FIG. 4A is observed as the distribution of the light intensity as shown in FIG. 3.

Also, in the case where the number of lenses in the cylindrical lens 203 is s =8 (n=4), the pattern of the interference is shown in FIG. 4B.

In FIG. 4, the square of an amplitude exhibits the intensity of the interference (the degree of mutually enhancing the light in phase). Also, in FIG. 4, symbol d denotes the length of the peak per one cycle.

FIG. 4 shows what is obtained by computer simulation, and the actual interference stripes caused by a laser do not exhibit such clear intensity. It is presumed that this is caused by the slight shift of the optical system, the dispersion, the refraction or the loss of the light due to an error of machining a material constituting the optical system or the optical system, the dispersion of the energy due to heat conduction within the semiconductor film, etc.

By the way, when the cylindrical lens group 203 and the cylindrical lens 205 in FIG. 2 are replaced by the parallelogram cylindrical lens group 501 and the parallelogram cylindrical lens 502 as shown in FIG. 5, the interference peak is appropriately dispersed within the linear beam, thereby making it difficult to produce the striped pattern shown in FIG. 1B.

This is disclosed in Japanese Patent Application Serial No. Hei 9-115275 by the present applicant.

It is needless to say that the same effect is obtained because of the symmetry of the optical system shown in FIG. 2 even if the cylindrical lens group 202 and the cylindrical lens 204 in FIG. 2 are replaced by the parallelogram cylindrical lens group 501 and the parallelogram cylindrical lens 502 shown in FIG. 5.

An angle X in FIG. 5 characterizes the parallelogram cylindrical lens. Since the optical system including the parallelogram cylindrical lens shown in FIG. 5 enables a plurality of interference patterns shown in FIG. 4 (the same number as the number of lenses in the cylindrical lens group 202) to be overlapped with each other while being shifted from each other, the peaks of the interference are dispersed. In other words, the peaks of the interference can be prevented from being repeatedly overlapped with each other at the same location.

In other words, the beams from the respective lens that construct the cylindrical lens group 202 are not overlapped with each other in the entirely same manner, but overlapped with each other so as to be slightly shifted from each other, thereby being capable of controlling the formation of the conventional interference pattern as shown in FIG. 4.

The configuration of the parallelogram cylindrical lens 502 described in the present specification is strictly defined here.

That is, the parallelogram cylindrical lens 502 is defined as follows:

a predetermined sectional shape is formed by a locus moved in parallel to a redetermined direction;

said sectional configuration allows two-dimensionally special parallel light rays having a specific wavelength to be converged on one point;

said parallelogram cylindrical lens is shaped such that a plane made by the collection of focal points formed when the parallel light is made incident from an arbitrary direction is orthogonal from a plane including the predetermined sectional shape as defined above;

a predetermined angle formed between said predetermined sectional shape and the predetermined direction as defined above form an angle X; and said angle X is not a right angle.

The respective shapes of the parallelogram cylindrical lens group 501 complies with the above parallelogram cylindrical lens 502, and has an angle equal to the above-defined angle X.

The respective predetermined sectional shapes of the parallelogram cylindrical lens group are congruous with each other, and different from those of the above parallelogram cylindrical lens.

Also, the respective predetermined sectional shapes of the parallelogram cylindrical lens group 501 used in the present invention may be concave lenses. This is because a light ray of the laser light processed by the parallelogram cylindrical lens group 501 which is made incident to the parallelogram cylindrical lens 502 is a light ray that progresses while being spread. Such a light ray is obtained from a convex lens and the concave lens in the same manner.

In the case of using the optical system having the structure shown in FIG. 5, the formation of the interference peak shown in FIG. 4 is restrained, but its degree depends on the combination of the angle X of the lens shown in FIG. 5, the number of lenses of the cylindrical lens 502, the number of lenses of the cylindrical lens group 501, etc.

The pattern of the interference stripes shown in FIG. 6A is a case in which the number of the lenses of the cylindrical lens group 203 is 7 in the device shown in FIG. 2.

The interference pattern becomes the intensity of the light intensity by squaring the value. The left and right direction in the figure corresponds to the longitudinal direction of the linear laser beam.

In this example, the length of the pattern per one period in FIG. 6A is defined as d. This corresponds to the pitches of the interference stripes.

As a result that a plurality of the above patterns are added together to calculate a pattern by which the peaks of the interference are most dispersed through a computer, it has been found that such an arrangement that two patterns are shifted from each other the half of one period and superimposed on each other is good.

In other words, a pattern shown in FIG. 6B which is obtained by shifting the pattern of FIG. 6A the half of one period is prepared, and the pattern of FIG. 6A and the pattern of FIG. 6B are superimposed on each other. As a result, a pattern shown in FIG. 6C is obtained.

The interference pattern shown in FIG. 6C is more dispersed in the degree of interference than the interference patterns shown in FIGS. 6A and 6B.

Also, the pattern of the interference stripes shown in FIG. 7A is in the case where the number of the cylindrical lens groups 501 is nine. The length of the pattern per one period is defined as d.

As a result that a plurality of those patterns are added together to calculate a pattern by which the peaks of the interference are most dispersed through a computer, it has been found that such an arrangement that three patterns are shifted from each other ⅓ period and superimposed on each other is good.

In other words, in the structure shown in FIG. 5, the interference patterns of FIG. 7A obtained when the number of the cylindrical lens group 501 is nine are shifted from each other ⅓ period as shown in FIGS. 7B and 7C, and they are superimposed on each other, thereby being capable of obtaining an interference pattern shown in FIG. 7D.

The interference pattern shown in FIG. 7D has the peaks of the interference very dispersed in comparison with that shown in FIGS. 7A to 7C.

In order to realize such an interference pattern, it is necessary to fabricate, for example, a laser beam having an interference state shown in FIG. 6A and a laser beam having an interference state shown in FIG. 6B.

The laser beam that passes through the combination of the cylindrical lens group 501 and the cylindrical lens 502 is the respective laser beams divided by the cylindrical lens 202.

Hence, when the respective laser beams divided by the cylindrical lens 202 are shifted from each other and superimposed on each other with a slight positional relation, there can be obtained a laser beam that prevents a state in which the interference peaks as shown in FIG. 6C or 7C are concentrated.

The present invention described in the present specification is to provide the optimum combination of various parameters with respect to the above matter.

In order to solve the above problems, the present invention is characterized by an optical system by which the distribution of the peaks of the interference is most efficiently dispersed.

In the case of applying the optical system shown in FIG. 5, the present invention is characterized by the provision of an optical system which comprises:

a cylindrical lens group 202 having a plurality of lenses each having a width W and designed to divide a light into $N(n-1)$ pieces (four divisions in case of FIG. 5) along the width direction (in the cross direction of the linear laser beam);

a parallelogram cylindrical lens group 501 having an angle X defined by $|\tan X|=W/(d/(n-1))$ and designed to divide a light into $(2n+1)$ pieces (seven divisions in case of FIG. 5) in the lateral direction (in the longitudinal direction of the linear laser beam);

a parallelogram cylindrical lens 502 having an angle X defined by $|\tan X|=W/(d/(n-1))$ and designed to re-couple the light divided in the lateral direction; and a cylindrical lens 204 designed to re-couple the light divided in the width direction.

Here, N is a natural number, and n is a natural number of 3 or more. Also, in the case shown in FIG. 5, since the cylindrical lens group 202 is made up of four lenses, the light is divided into four pieces by the cylindrical lens group 202. In other words, $N(n-1)=4$. Likewise, the light is divided into seven pieces by the cylindrical lens group 501. In other words, $(2n+1)=7$. Thus, $N=2$ and $n=3$.

In the above structure, d is an interval of the interference pattern (the length of one period) formed on a surface to be irradiated by a beam that has passed one of the lenses constituting the cylindrical lens group 202.

In order to obtain the value of d, a laser beam obtained when only one lens remains, and other lenses are covered in the cylindrical lens group 202 may be observed. Alternatively, the annealing effect of the laser beam, etc., may be observed.

Also, the value of d may be calculated as will be described in an embodiment later.

The above structure is characterized in that the value of X is determined by the combination of the interval d of the interference peaks of the beam made by one lens of the cylindrical lens group 202, the width W of one lens of the cylindrical lens group 202 and the number $N(n-1)$ of lenses of the cylindrical lens group 202.

With the above feature, the respective laser beams divided by the cylindrical lens group 202 are superimposed in a state shown in FIG. 6 or 7. Then, there can be obtained a laser beam the interference state of which is unified as shown in FIG. 6C or 7C.

In the structure shown in FIG. 5, in the case where the number of lenses (the number of division) of the parallelogram cylindrical lens group 501 is 7 (in case of n=3), the number of the cylindrical lens group 202 may be at least 2 at the time of N=1.

However, there is an actual problem that it is somewhat insufficient that the number of the lenses in the cylindrical lens group 202 is 2 in order to unify the energy.

In this case, a beam more excellent in uniformity is obtained if the number of the lenses in the cylindrical lens group 202 is the magnification of 2(=n−1, that is, n=3), for example, 4. That is, in case of N=2, it is desirable that the number of division of the cylindrical lens group 202 is set to be 4 or the magnification of 2.

In this case, the angle X of the parallelogram cylindrical lens group 501 and the parallelogram cylindrical lens 502 may be a value defined by $|\tan X|=W/(d/2)$, where W is a width of one lens in the cylindrical lens group 202.

Also, it is found that in the case the number of the lenses in the parallelogram cylindrical lens group is nine (n=4), the number of the lenses in the parallelogram cylindrical lens group 202 may be three at the minimum, that is, at the time of N=1.

However, there is a case where it is insufficient that the number of the lenses in the cylindrical lens group 202 is three in order to unify the energy.

In this case, a beam satisfactorily excellent in uniformity is obtained if the number of the lenses in the cylindrical lens group 202 is the magnification of 3, for example, 6.

In this case, the angle X of the parallelogram cylindrical lens group and the parallelogram cylindrical lens may be a value defined by $|\tan X|=W/(d/3)$.

In this way, in the case where the respective numbers of the constituent lenses in the parallelogram cylindrical lens group 501 are odd numbers, that is, in the case where the respective numbers of the lenses in the parallelogram cylindrical lens group 501 are expressed by (2n+1), there may be used the parallelogram cylindrical lens group 501 and the parallelogram cylindrical lens 502 each having the angle X defined by $|\tan X|=W/(d/(n-1))$.

The above structure is fundamental, and therefore another optical system may be arranged. In other words, the above structure may be employed as a part of the entire arrangement.

The above structure is effective particularly in processing an original beam not very high in the ratio of the longitudinal dimension to the lateral dimension in a linear laser beam 100 or more in the ratio of the longitudinal dimension to the lateral dimension.

On the other hand, in the case where the number of the lenses in the parallelogram cylindrical lens group is an even number, that is, in the case where the number of the lenses in the cylindrical lens group 501 shown in FIG. 5 is 2n, the remarkable effect is not obtained in comparison with the case where it is an odd number.

However, compared with the conventional optical system shown in FIG. 2, the great effect can be obtained. That is, the effect of correcting the unevenness of the irradiation can be obtained by the dispersion of interference.

Similarly, in this case, if the parallelogram cylindrical lens group 501 and the parallelogram cylindrical lens 502 having the angle X that satisfies $|\tan X|=W/(d/(n-1))$ are used, the peaks of interferences are well dispersed.

In this case, d is defined by the periodic width of the interference peaks (the length of one period) as shown in FIG. 4. That is, it is defined by the periodic width of the inference state appearing in the beams (linear laser beams) given by the cylindrical lenses that constitute the cylindrical lens group 202.

As is apparent from the above description, it is preferable that the respective intervals d of the interference stripes are constant in the linear laser beams. In other words, it is preferable that the interference appears along the longitudinal direction of the linear beam with the constant period shown in FIG. 4.

However, in general, the intervals of the peaks of interference of the linear laser beams formed by the optical system shown in FIG. 2 is not constant.

This is because the linear beam results from synthesizing the spherical wave into a line. When the spherical wave is cut by a straight linear wave, the interval between the in-phase waves is not constant (refer to FIG. 8).

If the intervals between the peaks of interference is intended to be nearly constant, the plane wave may be synthesized into a linear wave (if the plane wave is cut obliquely by a straight line, the interval between the in-phase waves becomes constant).

An optical system that forms the light wave of this type is shown in FIG. 8B.

What is different between both the above optical systems is that the laser beams divided by the cylindrical lens group on the beam incident side in FIG. 8B are processed into parallel light rays by the subsequent cylindrical lens.

The above optical system is simply obtained by appropriately selecting a distance between the forward cylindrical lens group and the backward cylindrical lens. With this structure, any beams divided by the cylindrical lens group are processed into plane waves by the subsequent cylindrical lens. If the beams processed according to the present invention is employed, the intervals between the longitudinal stripes become nearly constant. The optical system thus arranged is most proper.

However, even the linear beam synthesized by the spherical wave can be regarded as a parallel light ray as an actual problem since the radius of curvature of the spherical wave is sufficiently large, and therefore the present invention is applicable thereto. In this case, the interval d of the interference stripes is defined by the mean value of all the intervals.

As disclosed in Japanese Patent Application Serial No. Hei 9-115275 by the present applicant, even if the optical system shown in FIG. 2 in which only the cylindrical lens 205 is replaced by the parallelogram cylindrical lens is used, the effects of the present invention can be obtained. In this case, although the dispersion of interference becomes slightly uneven, the optical system of this type is superior to the conventional optical system from the viewpoints of the costs and troublesomeness.

Using the present invention described in the present specification, the distribution of the interference stripes within the linear laser beam is remarkably unified.

However, the unevenness of the energy due to the interference of light still exists within the linear laser beam. There is a case in which this unevenness is emphasized by the irradiation conditions of the laser beam.

In this situation, the unevenness is improved by finely adjusting the scanning direction of the laser beam. The fine adjustment is performed, as shown in FIG. 14, by conducting laser processing while scanning the linear laser beam in a direction shifted by an angle y from a direction including a plane orthogonal to the linear direction of the beam and formed by the linear laser beam within that plane. The angle y can be found in the range of $|\tan y|\leq 0.1$, where $|\tan y|\neq 0$.

When a semiconductor film is annealed by a laser through the optical system described in the present specification and used as a polycrystal semiconductor film to fabricate, for example, a device such as a TFT liquid crystal display device, the dispersion of the characteristics of the respective TFT is restrained, thereby being capable of obtaining an image with a high quality.

Also, when the present invention described in the present specification is applied to laser annealing used in the manufacture of a semiconductor integrated circuit, the characteristic of the devices formed on the same substrate can be unified, thereby being capable of obtaining a circuit high in performance.

Hereinafter, the respective aspects of the present invention described in the present specification are recited. In the following description, N is a natural number, n is a natural number of 3 or more, and d is pitches of the stripes of light interference distributed within the linear laser beam formed through one cylindrical lens constituting the cylindrical lens group 202 and a lens group other than the cylindrical lens group 202 in FIG. 5.

A laser irradiating apparatus according to a first aspect of the present invention is featured by comprising a first cylindrical lens group including a plurality of constituent lenses each having a width W for dividing a laser beam into N(n−1) sections along a width direction of the beam, a parallelogram second cylindrical lens group having substantially an angle X defined by $|\tan X|=W/(d/(n-1))$ for dividing the light into (2n+1) sections along a longitudinal direction of the beam, a parallelogram first cylindrical lens having substantially the angle X defined by $|\tan X|=W/(d/(n-1))$ for re-coupling the lights divided along the longitudinal direction, and a second cylindrical lens group for re-coupling the lights divided along the width direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to a second aspect of the present invention is featured by comprising a first cylindrical lens group including a plurality of constituent lenses each having a width W for dividing a laser beam into N(n−1) sections along a width direction of the beam, a second cylindrical lens group for dividing the laser beam into (2n+1) sections along a longitudinal direction of the beam, a parallelogram first cylindrical lens having substantially the angle X defined by $|\tan X|=W/(d/(n-1))$ for re-coupling the laser beams divided along the longitudinal direction, and a second cylindrical lens group for re-coupling the laser beams divided along the width direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to a third aspect of the present invention is featured by comprising a first cylindrical lens group including a plurality of constituent lenses each having a width W for dividing a laser beam into N(n−1) sections along a width direction of the beam, a parallelogram second cylindrical lens group having substantially an angle X defined by $|\tan X|=W/(d/(n-1))$ for dividing the laser beam into (2n) sections along a longitudinal direction of the beam, a parallelogram first cylindrical lens having substantially the angle X defined by $|\tan X|=W/(d/(n-1))$ for re-coupling the laser beams divided along the longitudinal direction, and a second cylindrical lens group for re-coupling the laser beams divided along the width direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to a fourth aspect of the present invention is featured by comprising a first cylindrical lens group including a plurality of constituent lenses each having a width W for dividing a laser beam into N(n−1) sections along a width direction of the beam, a second cylindrical lens group for dividing the laser beam into (2n) sections along a longitudinal direction of the beam, a parallelogram first cylindrical lens having substantially the angle X defined by $|\tan X|W/(d/(n-1))$ for re-coupling the laser beams divided along the longitudinal direction, and a second cylindrical lens group for re-coupling the laser beams divided along the width direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to a fifth aspect of the present invention is featured by comprising (1) means for generating a laser beam, (2) a beam homogenizer made up of an optical system including, a first cylindrical lens group including a plurality of constituent lenses each having a width W for dividing a laser beam into N(n−1) sections along a width direction of the beam, a parallelogram second cylindrical lens group having substantially an angle X defined by $|\tan X|=W/(d/(n-1))$ for dividing the laser beam into (2n+1) sections along a longitudinal direction of the beam, a parallelogram first cylindrical lens having substantially the angle X defined by $|\tan X|=W/(d/(n-1))$ for re-coupling the laser beams divided along the longitudinal direction, and a second cylindrical lens group for re-coupling the laser beams divided along the width direction, and (3) a moving table movable in one direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to a sixth aspect of the present invention is featured by comprising (1) means for generating a laser beam, (2) a beam homogenizer made up of an optical system including, a first cylindrical lens group including a plurality of constituent lenses each having a width W for dividing a laser beam into N(n−1) sections along a width direction of the beam, a second cylindrical lens group for dividing the laser beam into (2n+1) sections along a longitudinal direction of the beam, a parallelogram first cylindrical lens having substantially the angle X defined by $|\tan X|=W/(d/(n-1))$ for re-coupling the laser beams divided along the longitudinal direction, and a second cylindrical lens for re-coupling the laser beams divided along the width direction, and (3) a moving table movable in one direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to a seventh aspect of the present invention is featured by comprising (1) means for generating a laser beam, (2) a beam homogenizer made up of an optical system including, a first cylindrical lens group including a plurality of constituent lenses each having a width W for dividing a laser beam into N(n−1) sections along a width direction of the beam, a parallelogram second cylindrical lens group having substantially an angle X defined by |tan X|=W/(d/(n−1)) for dividing the laser beam into (2n) sections along a longitudinal direction of the beam, a parallelogram first cylindrical lens having substantially the angle X defined by |tan X|=W/(d/(n−1)) for re-coupling the laser beams divided along the longitudinal direction, and a second cylindrical lens group for re-coupling the laser beams divided along the width direction, and (3) a moving table movable in one direction, wherein the d is defined as an interval of the peaks of interference stripes formed on a plane on which the beam is irradiated which passes through one constituent lens constituting the first cylindrical lens group that divides the laser beam in the width direction.

A laser irradiating apparatus according to an eighth aspect of the present invention is featured by comprising (1) means for generating a laser beam, (2) a beam homogenizer made up of an optical system including, a first cylindrical lens group including a plurality of constituent lenses each having a width W for dividing a laser beam into N(n−1) sections along a width direction of the beam, a second cylindrical lens group for dividing the laser beam into (2n) sections along a longitudinal direction of the beam, a parallelogram first cylindrical lens having substantially the angle X defined by |tan X|=W/(d/(n−1)) for re-coupling the laser beams divided along the longitudinal direction, and a second cylindrical lens group for re-coupling the laser beams divided along the width direction, and (3) a moving table movable in one direction, wherein the d is defined as an interval of the peaks of interference stripes formed on a plane on which the beam is irradiated which passes through one constituent lens constituting the first cylindrical lens group that divides the light in the width direction.

In the above-described constitution, the d is expressed by $\lambda f/L$, where $\lambda$ is a wavelength of the laser beam, f is a focal length of the parallelogram first cylindrical lens that re-couples the laser beams divided along the longitudinal direction, and L is a width of one constituent lens in the second cylindrical lens group that divides the laser beam along the longitudinal direction. In this case, the d can be obtained by calculation.

Further, the above-described invention is particularly effective in the case where the laser beam on a plane to be irradiated is a linear beam whose longitudinal length is longer than a width length thereof.

Further, an excimer laser is generally used as the laser beam.

Further, it is preferred that the moving table is variable in its moving direction.

The present invention does not reflect the periodic unevenness of an energy due to the interference of a light formed within the linear laser beam on the semiconductor film in crystallizing or improving the crystallinity of a non-single crystal semiconductor film using a laser beam obtained by re-constructing laser beams into which an original laser beam has been divided and processing them into the linear laser beam.

For example, the energy of the linear laser beam formed through the optical system shown in FIG. 2 exhibits the periodic repeat of the high/low of the energy in the linear direction.

When the linear laser beams having the above distribution of energy are scanned on the semiconductor film while they are superimposed on each other in a direction perpendicular to the linear direction of the linear laser, the distribution of energy within the linear laser beam is caused to be emphasized within the semiconductor film.

According to the present invention, the use of the parallelogram beam homogenizer of the present invention allows the distribution of interference within the linear laser beam to be remarkably dispersed more than the conventional one to unify the distribution of energy within the linear laser beam. With such a structure, laser annealing can be more uniformly conducted.

DETAILED DESCRIPTION OF THE PREFERRED EMBODIMENTS

Figure 1A:
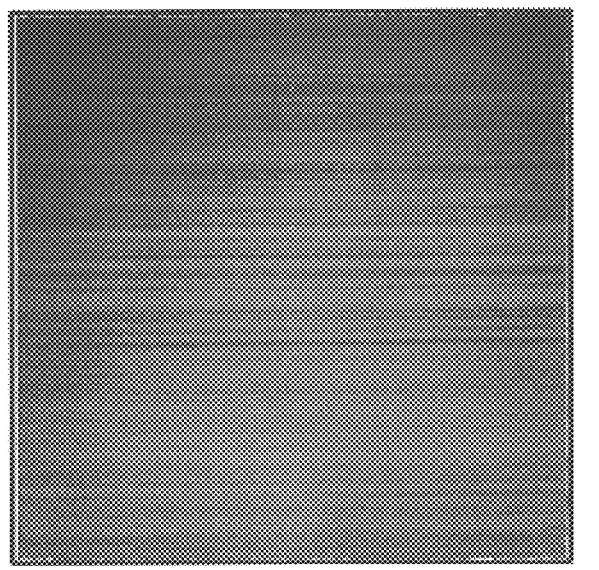
FIGS. 1A and 1B are pictures showing a silicon film crystallized by a linear laser.
Figure 1B:
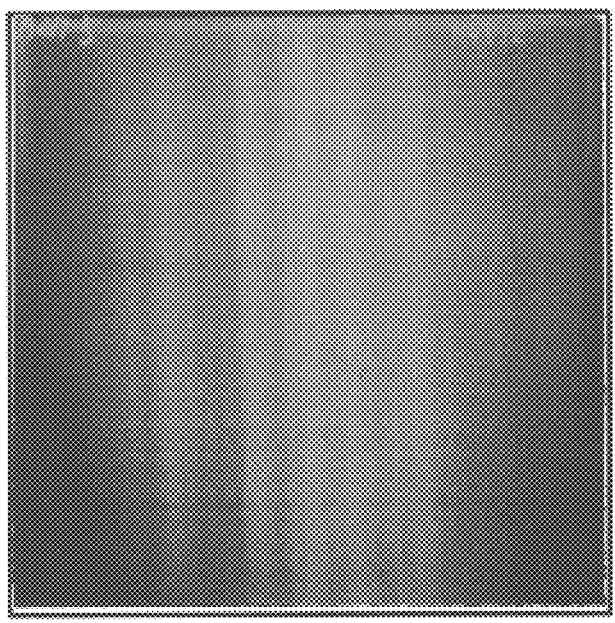
Figure 2:
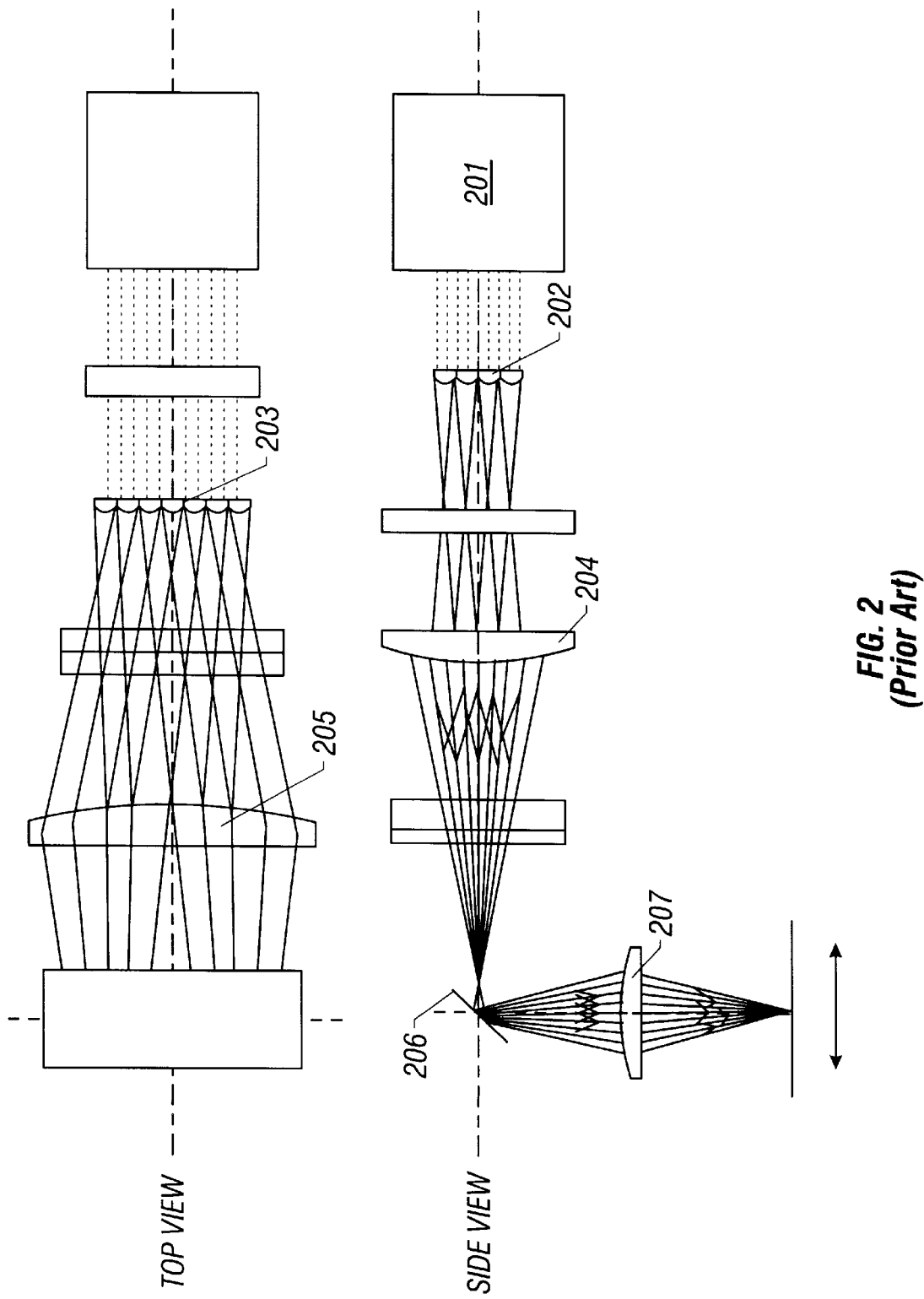
FIG. 2 is a diagram showing an optical system and an optical path for forming a linear laser in a conventional example.
Figure 3:
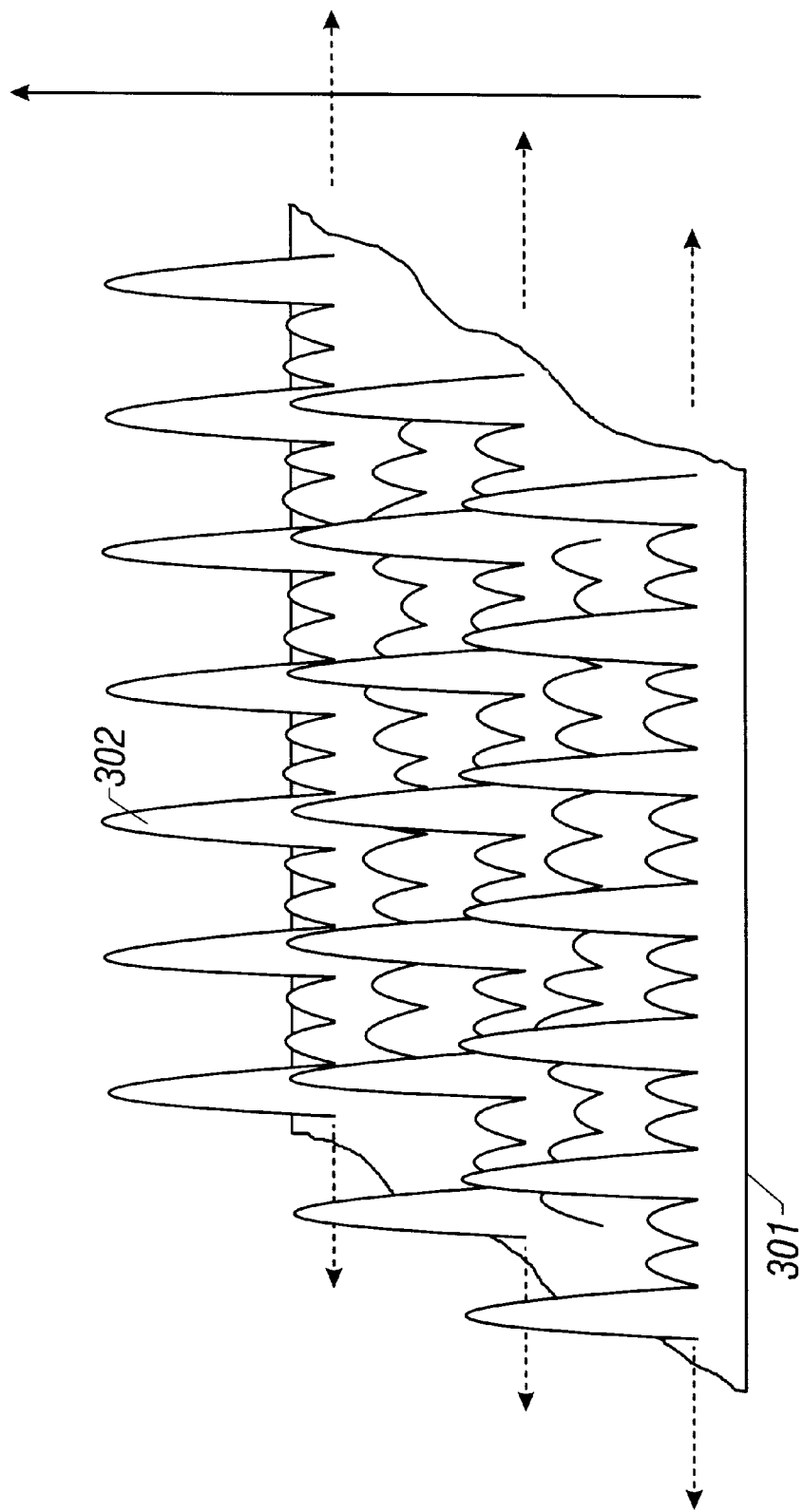
FIG. 3 is an illustration showing the interference of a light within a linear laser beam formed by a conventional optical system.

In a manufacturing process of this embodiment, there is first described a method of manufacturing a semiconductor film on which a laser beam is irradiated. There are three kinds of semiconductor films on which a laser beam is irradiated in the present specification. The present invention is effective to any semiconductor films.

First, any one of three kinds of semiconductor films is formed in such a manner that a silicon oxide film functioning as a base film is formed in thickness of 200 nm on a corning 1737 glass substrate 127 mm square as a substrate, and an amorphous silicon film is formed in thickness of 50 nm thereon. They are formed through the plasma CVD method.

The amorphous silicon film is called "a starting film" below.
(Procedure of manufacturing a semiconductor film A)

The starting film is heated at 450° C. for one hour. This process is a process for reducing the concentration of hydrogen in an amorphous silicon film When hydrogen in the film is too much, since the film cannot withstand a laser energy, this process is required.

The density of hydrogen within the film is appropriately $10^{20}$ atoms/cm$^3$ order. This film is called "a non-single crystal silicon film A". (Procedure of manufacturing a semiconductor film B)

Nickel acetate aqueous solution of 10 ppm is formed on the starting film through the spin coating method, as a result of which a nickel acetate layer is formed on the starting film. It is more preferable that an interfacial active agent is added to the nickel acetate aqueous solution. Since the nickel acetate layer is very thin, it leads to no problem although it is not always in the form of a film.

Subsequently, a heat annealing is conducted on the substrate on which the respective films are laminated as in the above manner at 600° C. for 4 hours. As a result, the amorphous silicon film is crystallized to form a crystalline silicon film B which is a non-single crystal silicon film.

In this situation, nickel which is a catalytic element serves as nuclei of crystal growth to promote crystallization. That crystallization can be conducted at a low temperature for a short period of time, such as at 600° C. for 4 hours is because of the function of nickel. The details are disclosed in Japanese Patent Application Laid-open No. Hei 6-244104.

The concentration of the catalytic elements is preferably $1 \times 10^{15}$ to $1 \times 10^{19}$ atoms/cm$^3$. In case of the high concentration of $1 \times 10^{19}$ atoms/cm$^3$ or more, a metallic property is exhibited in the crystalline silicon film, whereby the characteristic of the semiconductor disappears. In this embodiment, the concentration of the catalytic elements in the crystalline silicon film is $1 \times 10^{17}$ to $5 \times 10^{18}$ atoms/cm$^3$. Those values are obtained by analyzing and measuring the secondary ion mass spectroscopy (SIMS).
(Procedure of manufacturing a semiconductor film C)

A silicon oxide film is further formed on the starting film in thickness of 700 Å. The film forming method is a plasma CVD.

Then, an opening is completely formed in a part of the silicon oxide film through a photolitho-patterning.

Moreover, in order to form the thin oxide film in the opening portion, a UV ray is irradiated onto the opening portion under an oxygen atmosphere for 5 minutes. The thin oxide film is formed in order to improve the wettability of the opening portion with respect to a nickel aqueous solution which will be introduced later.

Then, the nickel acetate aqueous solution of 100 ppm is coated on the film through the spin coating method. As a result, nickel acetate is formed on the opening portion. It is more preferable that an interfacial active agent is added to the nickel acetate aqueous solution.

Thereafter, heat annealing is conducted on the substrate at 600° C. for 8 hours, as a result of which crystal grows in parallel with the substrate (lateral direction) from the nickel introduced portion. In this situation, nickel serves as crystal nuclei as in the film B. A lateral growth distance is about 40 μm under the above conditions.

Thus, the amorphous silicon film is crystallized to form a crystalline silicon film which is a non-single crystal silicon film. Thereafter, the silicon oxide film on the crystalline silicon film is peeled off and removed using a buffer hydrofluoric acid.

In this way, the non-single crystal silicon films A, B and C are obtained.

Then, in order to further enhance crystallinity, a laser annealing is conducted using an excimer laser.

Figure 9:
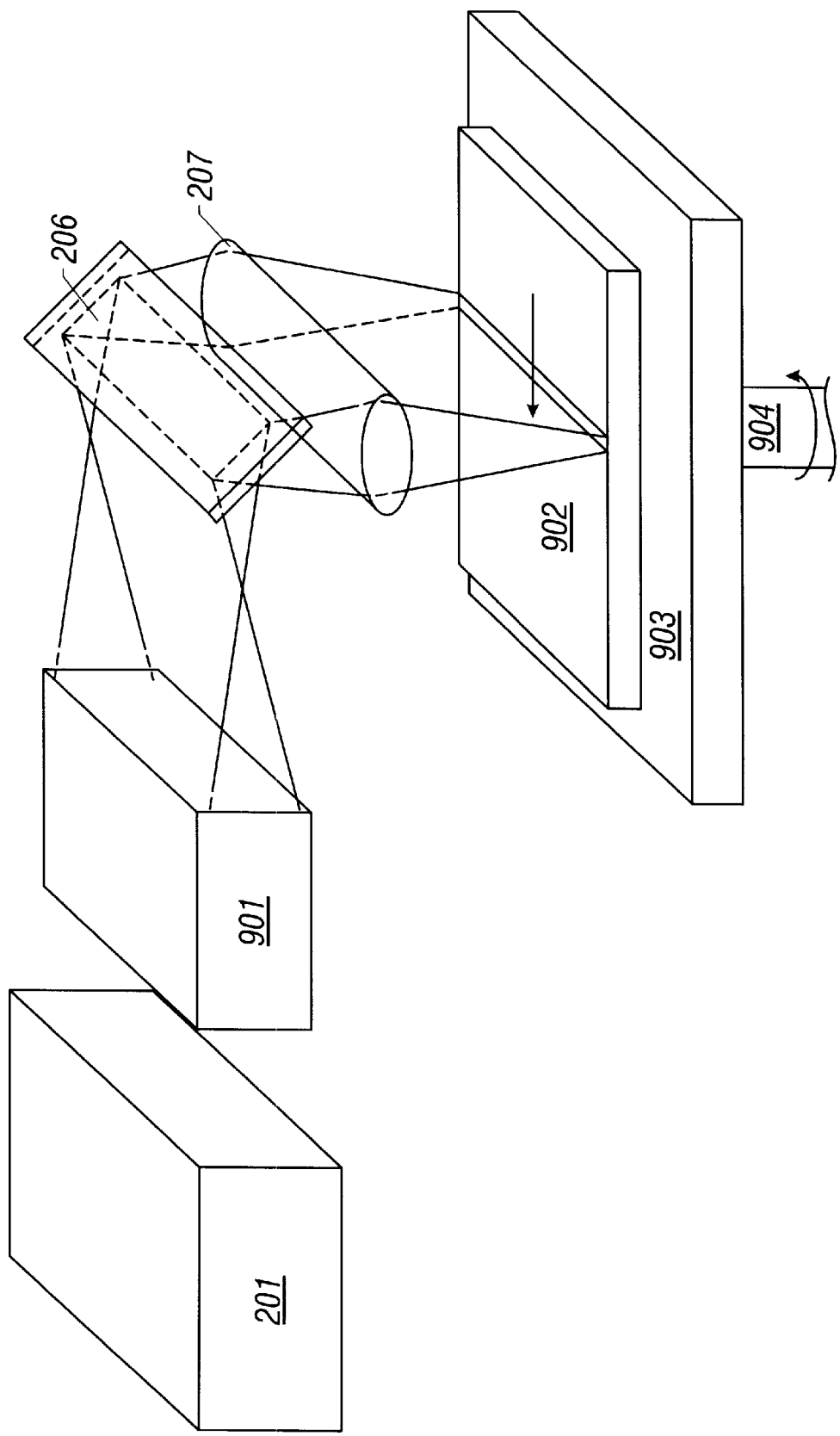
FIG. 9 is a diagram showing a laser irradiation system in the embodiment.

FIG. 9 shows a laser irradiation system in this embodiment. FIG. 9 is a schematic view of the laser irradiation system.

In FIG. 9, the laser irradiation system functions to allow a pulse laser beam which is emitted from a laser oscillation device 201 and processed into a line in sectional configuration by an optical system 901 to be reflected by a mirror 206, converged by a cylindrical lens 207 and irradiated onto a substrate 902 to be processed.

Figure 5:
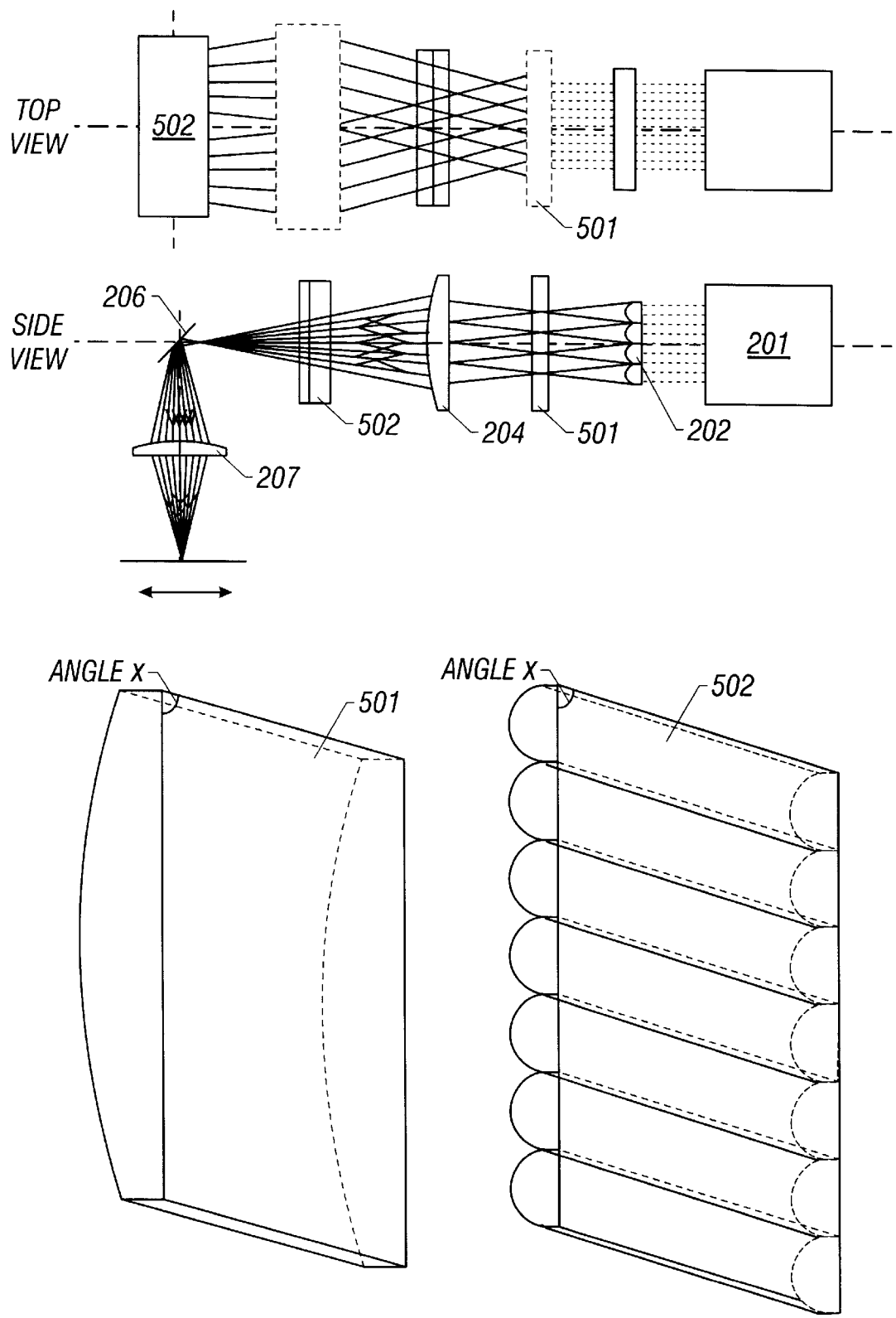
FIG. 5 is a diagram showing an optical system and an optical path for forming a linear laser according to an embodiment of the present invention.

The optical system 901, the mirror 206 and the cylindrical lens 207 have the structure shown in FIG. 5.

The optical system used in this embodiment is designed as described in the first aspect of the present invention. In the structure shown in FIG. 5, it is assumed that an angle X provided by the parallelogram cylindrical lens group 501 and the parallelogram cylindrical lens 502 is 86°.

Then, a method of determining the angle X will be described.

In case of this embodiment, the pitches of the stripes of light interference distributed within the linear laser beam formed through one constituent lens of the cylindrical lens group 202 and a lens group other than the cylindrical lens group 202 in FIG. 5 is 0.4 mm. The value corresponds to the parameter d. W defined as described above is 3 mm in this optical system.

As described above, the angle X calculated by $|\tan X|=W/(d/(n-1))$ is an angle by which the peaks of interference can be most dispersed within the linear laser beam.

In this example, the respective values of d, W and n are substituted in the above expression. In this embodiment, n=3.

As a result, the number of dividing the laser beam in the width direction (cross direction of the linear beam) is determined by (3−1), that is, the magnification of 2. In this embodiment, N=2, and a light beam is divided into 4 sections in the width direction by the cylindrical lens 202. Also, the number of dividing the laser beam in the lateral direction (the longitudinal direction of the linear beam) is necessarily determined to (2×3+1)=7.

The reason why the optical systems shown in FIGS. 5 and 9 are used is that the beam configuration can be processed into a linear beam while the unevenness of energy of the beam before it is made incident to the optical system is superimposed on each other after being divided, to thereby average the unevenness of the energy.

The linear laser beam used in the present invention complies with the optical system shown in FIG. 5. The function of the lenses of the type shown in FIG. 5 will be described below.

The cylindrical lens groups 202 and 501 are designed to divide the original beam in the width direction and in the longitudinal direction. Then, the cylindrical lenses 204 and 502 are designed to superimpose the divided laser beams on each other.

In this embodiment, the original beam is divided into four sections in the width direction of the linear laser beam and divided into seven sections in the longitudinal direction of the linear laser beam.

For convenience, the laser beam is designed to synthesize 28-divided beams into one beam. With this arrangement, the distribution of energy of the beam can be averaged.

The ratio of the width length of the beam to the longitudinal length thereof is variable due to the structure of the lens groups. However, the configuration of the beam which is easily manufactured is restricted by the combination of the size of the lenses and the focal length. In this optical system, the length of the beam in the longitudinal direction cannot be varied.

Figure 8A:
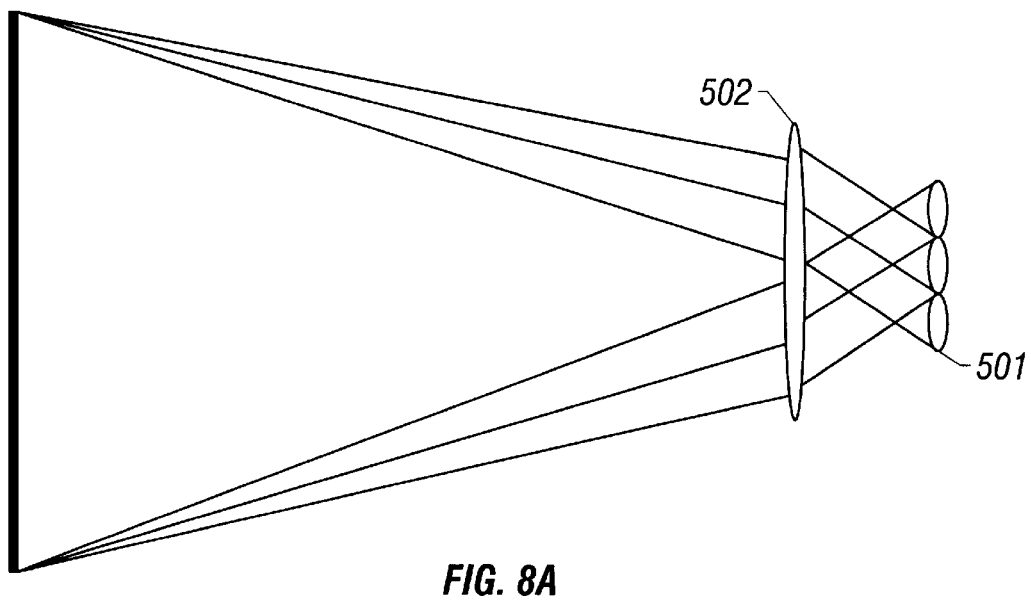
FIGS. 8A and 8B are diagrams showing a difference between the arrangement of an optical system for producing a plane wave and the arrangement of an optical system for producing a spherical wave.
Figure 8B:
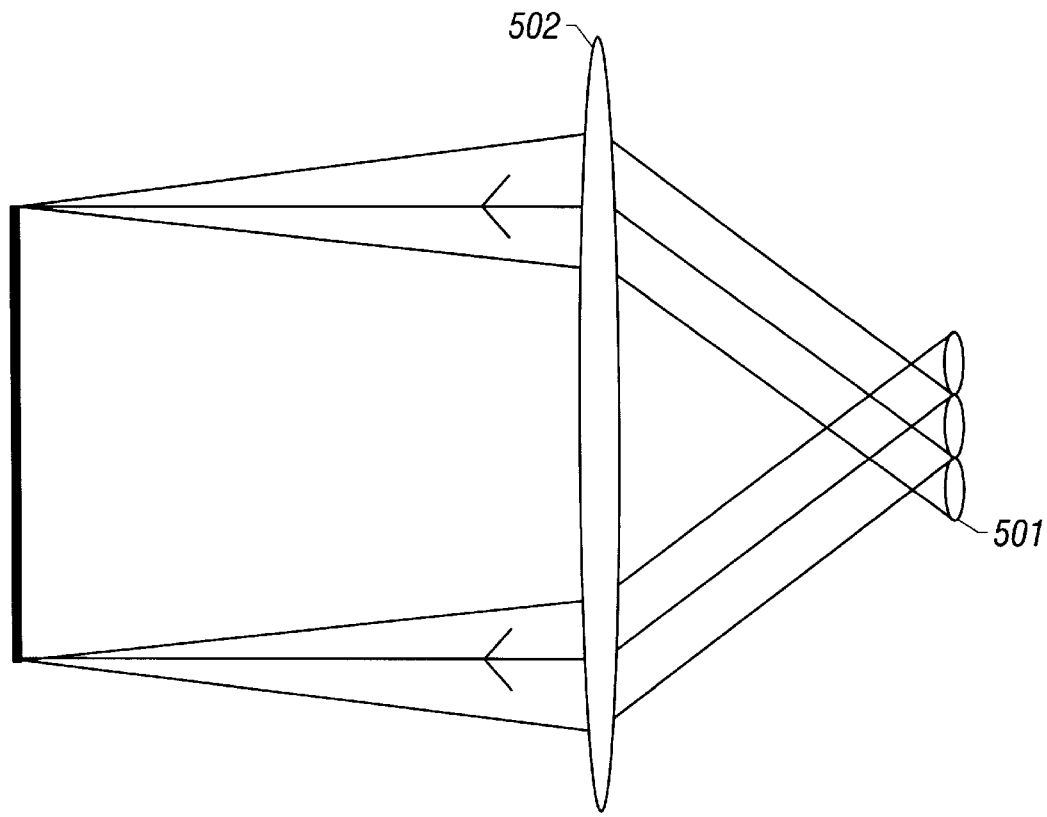

This embodiment is effective even if any lens groups arranged as shown in FIGS. 8A and 8B are used. The arrangement shown in FIG. 8B is rather effective.

Although the cylindrical lens group 202 and the parallelogram cylindrical lens group 501 shown in FIG. 5 are convex lenses, even if the concave lenses or the lenses of the concave/convex mixture is used, the essence of the present invention is not adversely affected at all.

Figure 11:
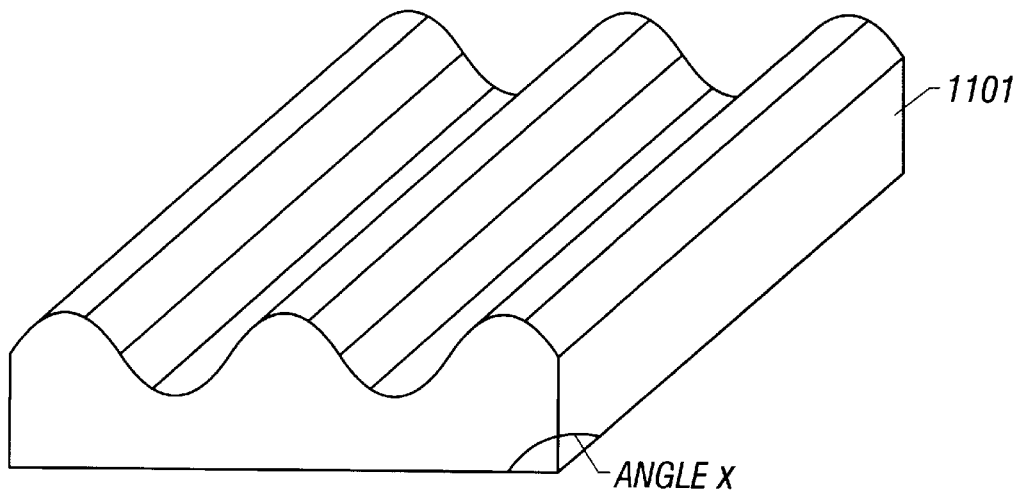
FIG. 11 is a diagram showing an example of a concave/convex mixture parallelogram cylindrical lens.

When the parallelogram cylindrical lens group 501 shown in FIG. 5 is replaced by the concave/convex mixture lenses having the same function, the resultant structure is shown in FIG. 11.

However, in the case where the lenses that do not amalgamate with each other as represented by the concave/convex mixture lens group 1101 are used, they must be constituted by lenses which are identical with each other in the angle of the expansion the parallel light rays processed by the lenses after being processed.

If not, when the divided beams are re-coupled with each other, the respective beams are superimposed on each other with different sizes and shapes, thereby making the outline of the beams unclear.

In this example, the laser oscillation device 201 is adopted to oscillate the XeCl excimer laser (308 nm in wavelength). Alternatively, KrF excimer laser (248 nm in wavelength) and so on may be used.

The substrate 902 to be processed is disposed on a stage 903. Then, the stage 903 is straightly traveled in a direction perpendicular to the longitudinal direction of the linear laser beam, that is, in the width direction of the beam (including a flat surface having the linear laser beam) by a moving mechanism 1007, thereby enabling the laser beam to be irradiated on a top surface of the substrate 902 to be processed while it is being scanned.

Figure 10:
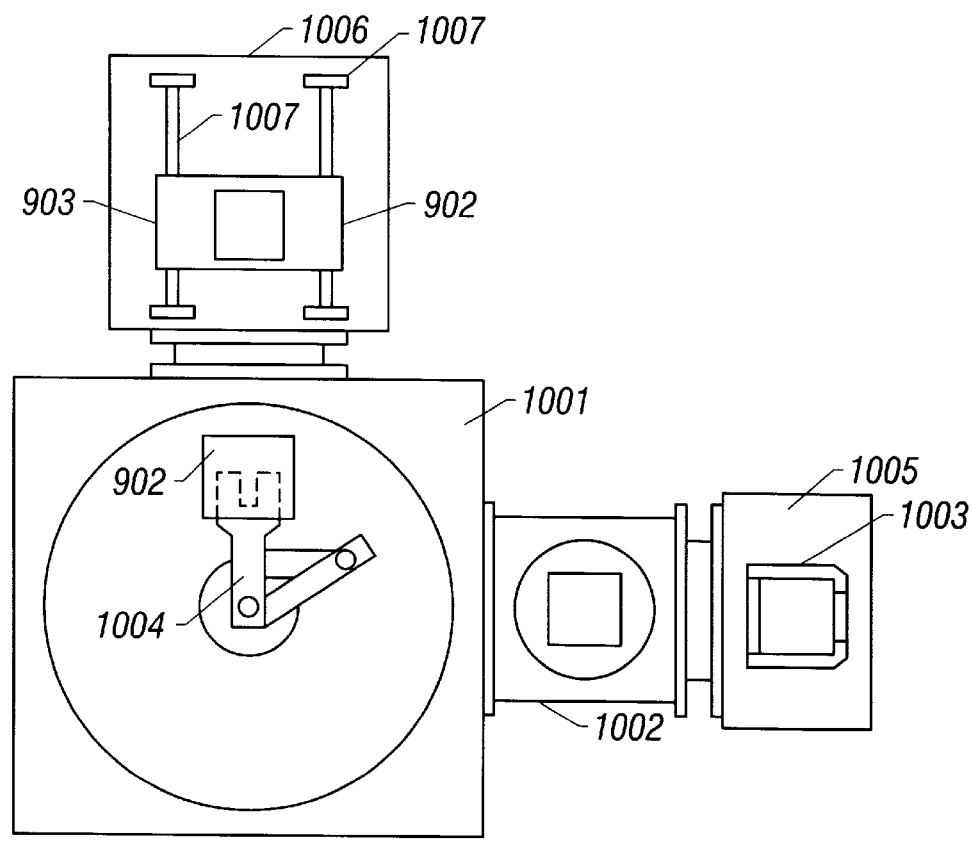
FIG. 10 is a top view showing a laser annealing device in the embodiment.

The device shown in FIG. 10 will be described. A cassette 1003 in which a large number of substrates 902 to be processed, for example, 20 pieces of substrates 902 are accommodated is disposed in a load/unload chamber 1005. One substrate is moved from the cassette 1003 to an alignment chamber 1002 by a robot arm 1005.

In the alignment chamber 1002 is disposed an alignment mechanism for correcting the positional relation between the substrate 902 to be processed and the robot arm 1004. The alignment chamber 1002 is connected to the load/unload chamber 1005.

The substrate is carried to a substrate carrier chamber 1001 by the robot arm 1004, and further transferred to a laser irradiation chamber 1006 by the robot arm 1004. In FIG. 9, it is assumed that the linear laser beam irradiated onto the substrate 902 to be processed is 0.4 mm in width ×135 mm in length. This beam is formed by the arrangement of the lenses shown in FIG. 5.

The density of energy of the laser beam on a plane to be irradiated is set to, for example, 300 mJ/cm$^2$ within the limit of 100 to 500 mJ/cm$^2$. The stage 903 is moved in one direction at a rate of 1.2 mm/s to scan the linear laser beam. The oscillation frequency of the laser is set to 30 Hz, and attention is paid to one point of an object to be irradiated. Then, a laser beam of 10 shots is irradiated thereon. The number of shots is appropriately selected from the range of 5 to 50 shots.

After the laser irradiation has been completed, the substrate 902 to be processed is returned to the substrate carrier chamber 1002 by the robot arm 1004.

The substrate 902 to be processed is transferred to the load/unload chamber 1005 by the robot arm 1004 and then accommodated in the cassette 1003.

Thus, the laser annealing process is completed. In this way, the above process is repeated so that a large number of substrates can be sequentially processed one by one.

Although this embodiment uses the linear laser, even if any beam configurations including the linear configuration and the square configuration are used in the present invention, the effect of the present invention is obtained.

Also, in this embodiment, if the parallelogram cylindrical lens 502 is used, even if the conventional rectangular cylindrical lens group 203 is substituted for the parallelogram cylindrical lens group 501, the effect of the present invention is obtained. However, the number of the cylindrical lenses that constitute the cylindrical lens group 203 is defined as described in this embodiment.

If a TFT having the semiconductor film annealed by the laser as described above as an active layer is manufactured, any n-channel type and p-channel type can be manufactured.

Also, the structure combining the n-channel and the p-channel type TFTs can be also obtained. Further, an electronic circuit can be structured by integrating a large number of TFTs.

The above description is applicable to a semiconductor film which is annealed by a laser through the optical system described in other embodiments. In the case where a liquid crystal display device made up of TFTs is manufactured using the semiconductor film which is annealed by a laser through the optical system of the present invention, a high-quality image can be obtained which is reduced in the dispersion of the respective TFT characteristics.

In the case where the stripped pattern does not well disappear in this embodiment, the arrangement of the optical system is improper, or the intervals of the superimposition of the linear laser beams are improper. In this case, the scanning direction of the substrate is finely adjusted by the scanning direction changing device 904 so that a scanning direction by which the interference stripes are more unobtrusive may be selected.

Figure 14:
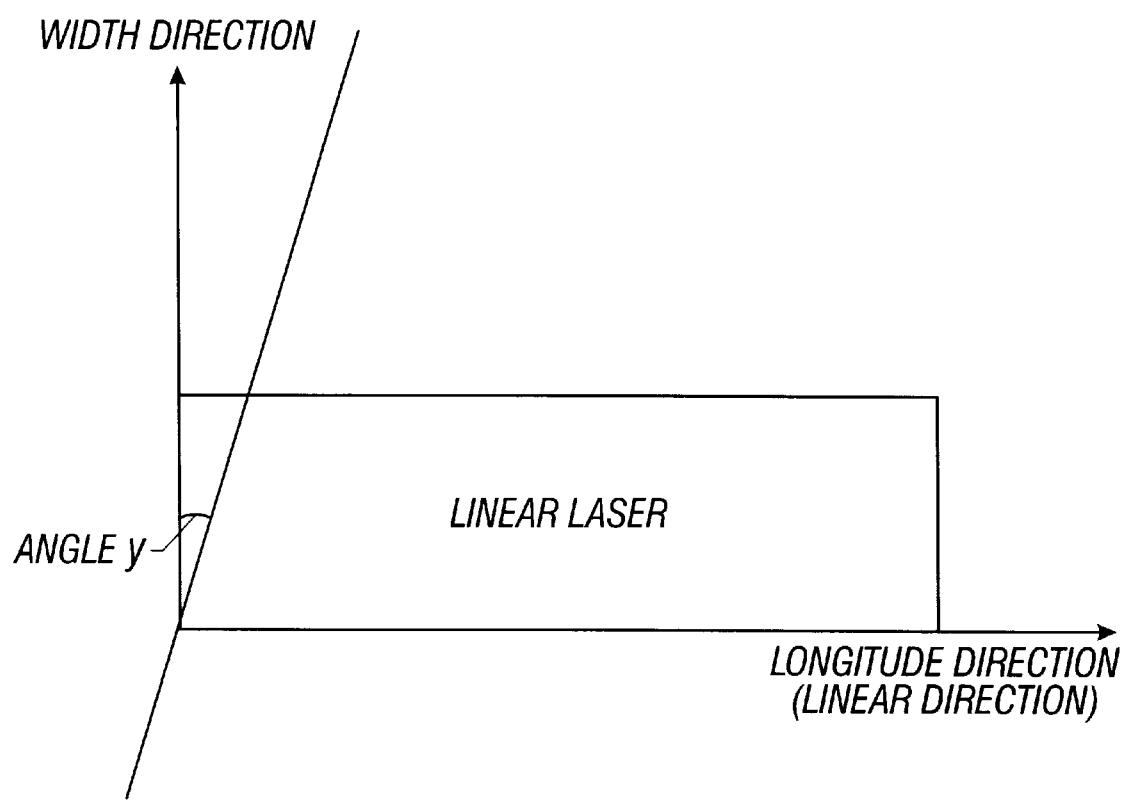
FIG. 14 is a graph depicting that where scanning may be made in a direction shifted by angle y from a width direction of the linear laser beam.

That is, as shown in FIG. 14, the scanning may be made in a direction shifted by the angle y from the width direction of the linear laser beam. This angle can be found within the limit of $|\tan y| \leq 0.1$, where $|\tan y| \neq 0$.

The pitches d of the interference stripes when the arrangement of the optical system shown in FIG. 8B is applied to this embodiment can be readily derived through calculation. Hereinafter, its calculating method will be described.

The optical system shown in FIG. 8 is a section of the cylindrical lens group 501 and the cylindrical lens 502 shown in FIG. 5.

In the case where the arrangement of the optical system shown in FIG. 8B is applied, the beams to be synthesized by the cylindrical lens 502 are a plane wave, respectively.

Figure 12:
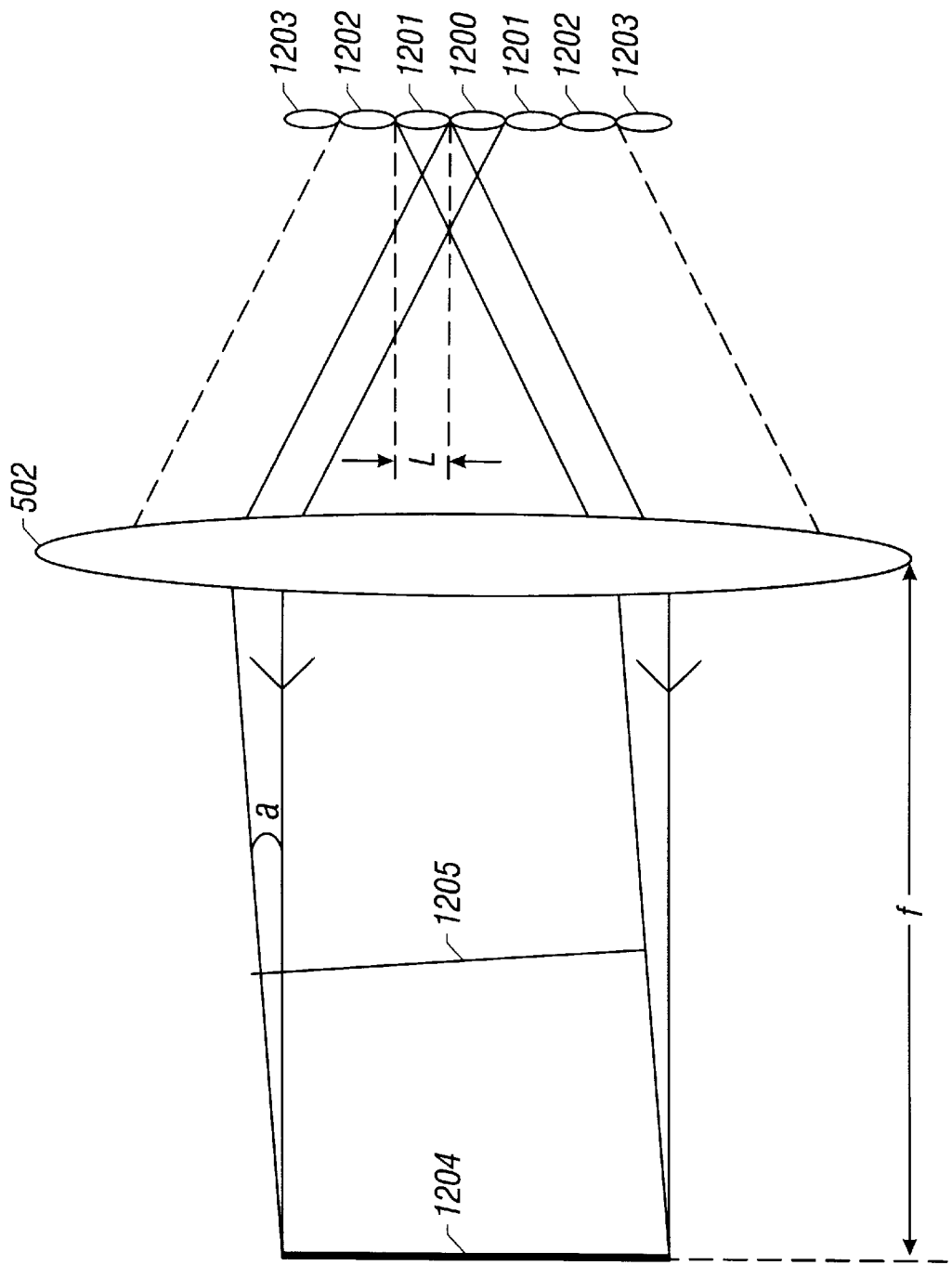
FIG. 12 is a diagram showing parameters necessary for obtaining the pitch d between the interference stripes through calculation.

In this case, in FIG. 12, the optical flux of the laser beam incident to the parallelogram cylindrical lens 502 through the two lenses 1201 adjacent to a center lens 1200 of the constituent lenses that constitute the parallelogram cylindrical lens group 501 is transverse to the irradiation plane 1204 at an angle α.

Figure 13:
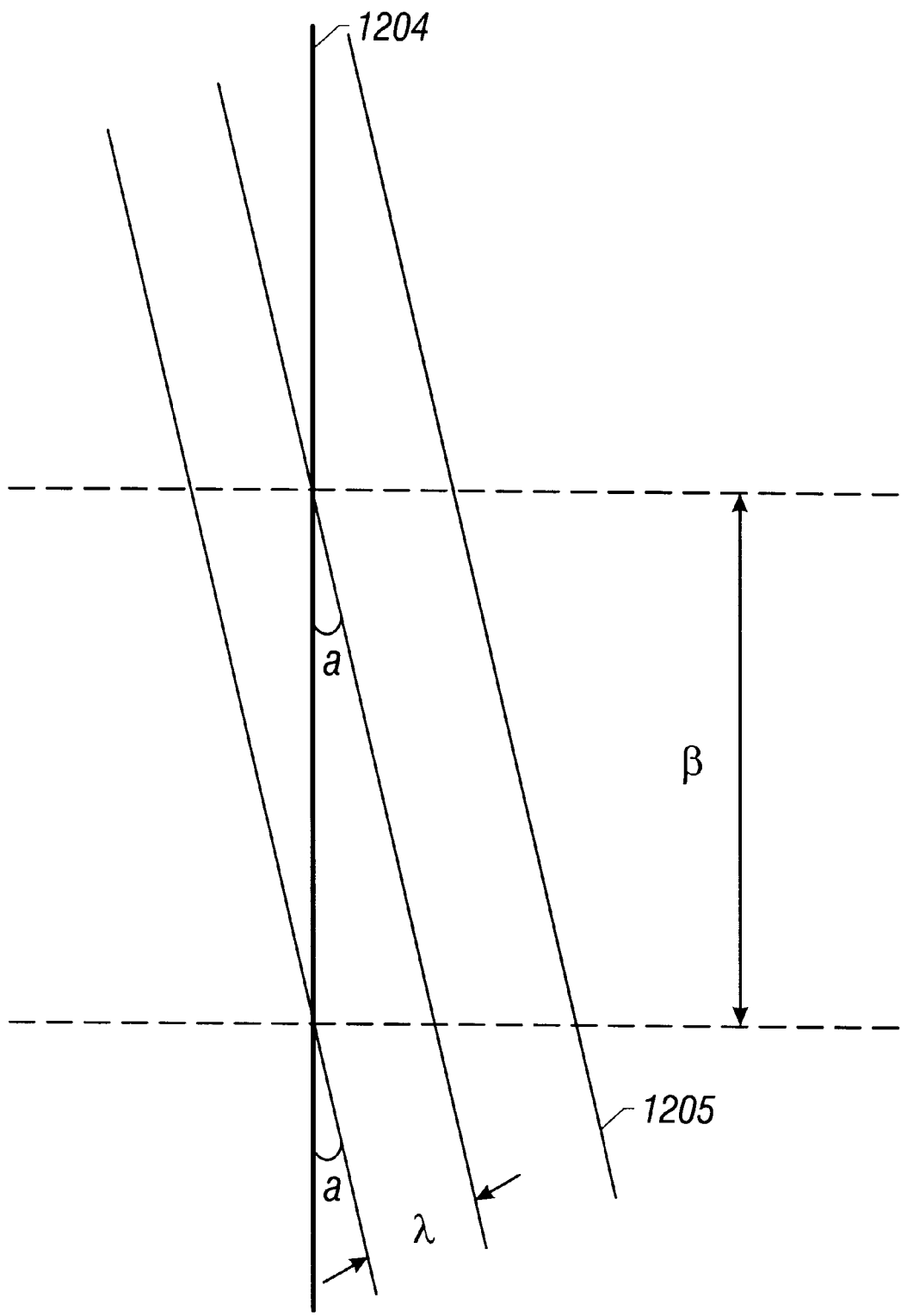
FIG. 13 is a diagram showing parameters necessary for obtaining the pitch d between the interference stripes through calculation.

Since the wave plane 1205 of the laser is straight, the straight lines drawn at the intervals of the wavelength λ cut the irradiation plane 1204 at intervals β (refer to FIG. 13).

The relational expression of the angle α and the interval β can be expressed using the wavelength λ. That is, it can be expressed by β=λ/sin α.

Figure 4A:
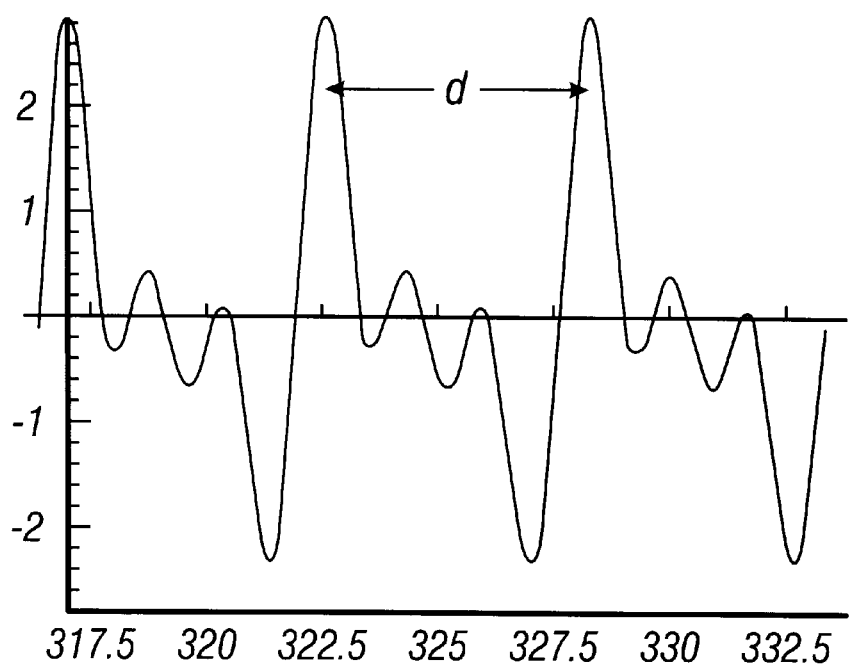
FIGS. 4A and 4B are diagrams showing the appearance of the interference of a light within the linear laser beam formed by the optical system.
Figure 4B:
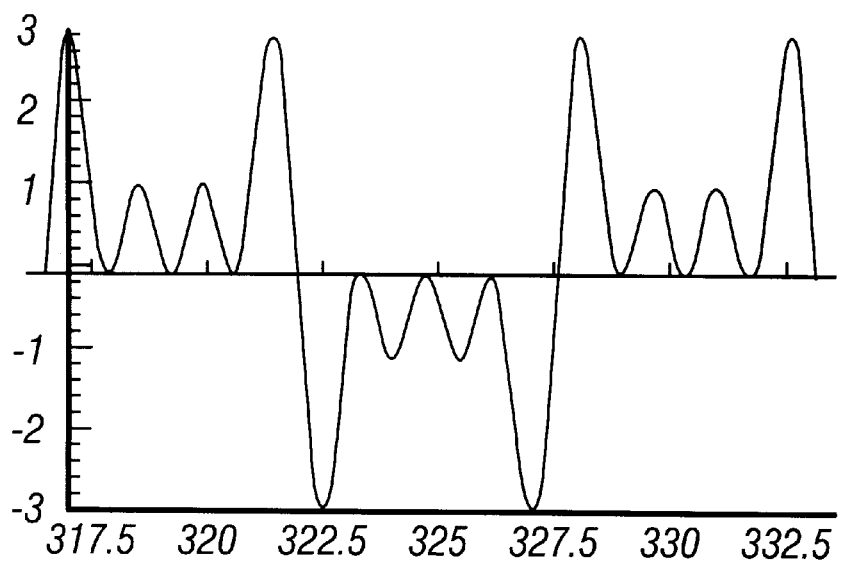
Figure 6A:
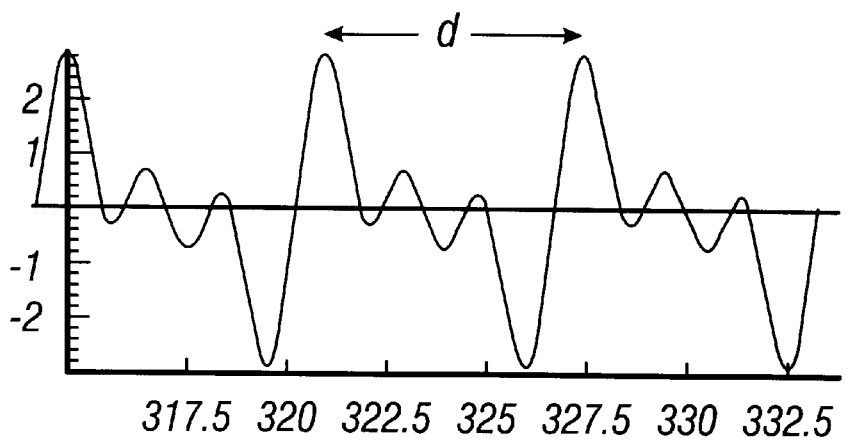
FIGS. 6A to 6C are diagrams showing how to superimpose interference stripes by which the light interference is made unobtrusive.
Figure 6B:
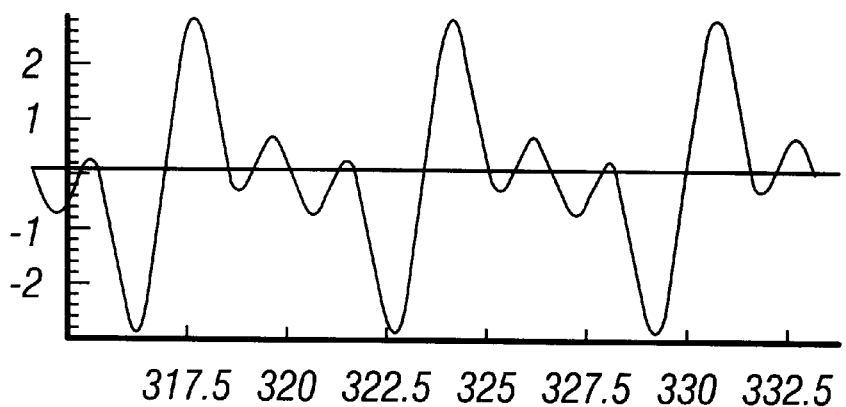
Figure 6C:
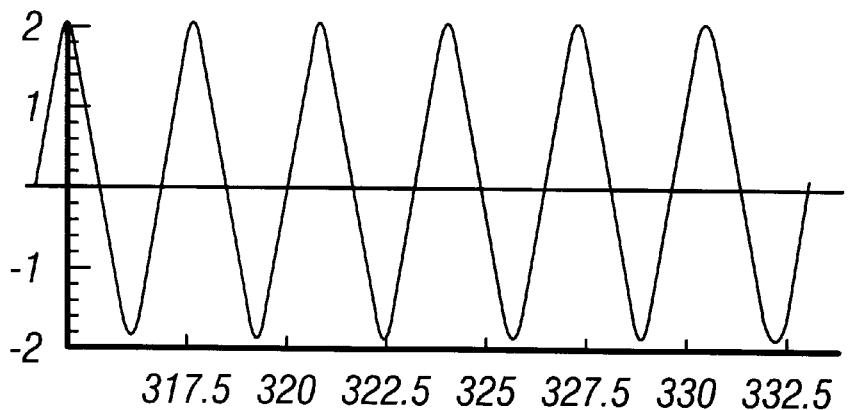
Figure 7A:
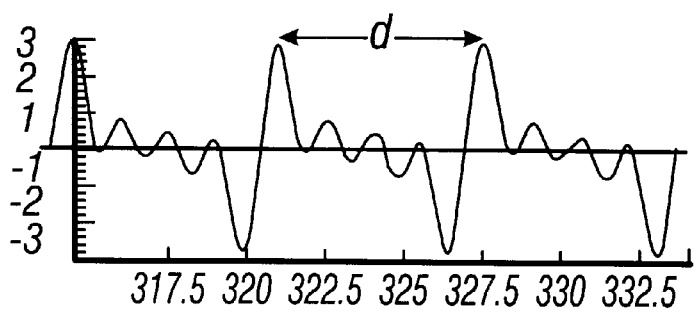
FIGS. 7A to 7D are diagrams showing how to superimpose interference stripes by which the light interference is made unobtrusive.
Figure 7B:
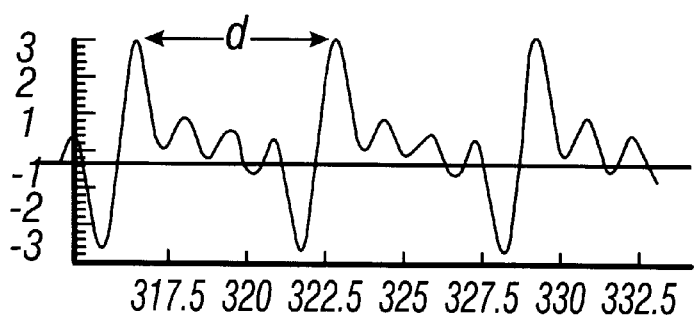
Figure 7C:
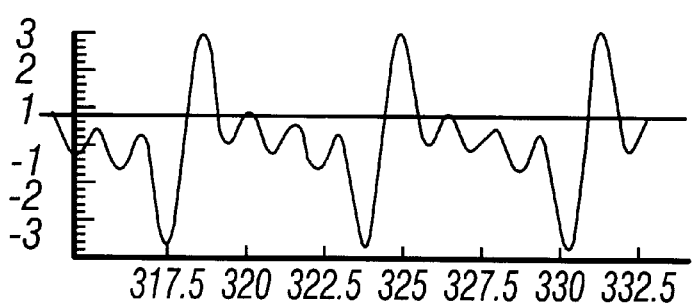
Figure 7D:
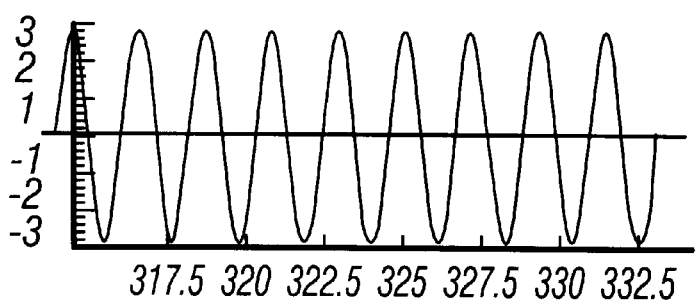

The two lenses 1201 form a stationary wave of the intervals β on the irradiation plane 1204. Then, the intervals β coincide with the intervals d of the peaks of interference shown in FIGS. 4, 6 and 7.

Also, in this case, assuming that the focal length of the parallelogram cylindrical lens 502 is f, and a width of each constituent lens in the parallelogram cylindrical lens group 501 is L, tan α=L/f is satisfied.

Also, since the angle α is sufficiently small, tan α≈sin α is satisfied. Hence, β=λf/L is satisfied.

As described above, since β=d is generally satisfied, d is represented by about λf/L In this way, even if being not actually measured, if the focal length f of the parallelogram cylindrical lens 502 and the width L of each constituent lens in the parallelogram cylindrical lens group 501 and the wavelength λ of the laser beam are found, the length d of one period of the peaks of interference appearing in the beams that have passed through one constituent lens of the cylindrical lens group 202 shown in FIG. 5 can be obtained.

In the case where the optical system shown in FIG. 8A is applied, the beams that have passed through the cylindrical lens 502 is of the spherical wave, and the above mathematic expressions are not completely satisfied.

Hence, in case of FIG. 8A, the stationary wave is produced by synthesizing the spherical waves, and the value of d is calculated from the stationary wave through a computer.

However, if a sum of the focal distance f of the cylindrical lens 502 and the focal length of the cylindrical lens group 501 is close to the interval of the cylindrical lens 502 and the cylindrical lens group 501, d obtained by the above mathematic expressions can be utilized.

According to the present invention, the uniformity within the plane, of the effect of laser annealing using a laser beam whose quality is unified by division and re-coupling can be remarkably improved.

What is claimed is:

1. A laser irradiating apparatus comprising:
   a first cylindrical lens group including a plurality of constituent lenses each having a width W for dividing a laser beam into N(n−1) sections along a width direction of the laser beam;
   a parallelogram second cylindrical lens group having an angle X defined by $|\tan X|=W/(d/(n-1))$ for dividing the laser beam into (2n+1) sections along a longitudinal direction of the laser beam;
   a parallelogram first cylindrical lens having the angle X defined by $|\tan X|=W/(d/(n-1))$ for re-coupling the laser beam divided along the longitudinal direction; and
   a second cylindrical lens group for re-coupling the laser beam divided along the width direction;
   wherein said d is defined as an interval of peaks of interference stripes formed on a plane on which the laser beam is irradiated which passes through one constituent lens of the first cylindrical lens group that divides the laser beam in said width direction, and
   wherein said N is a natural number, said n is a natural number of 3 or more, said angle X is not a right angle, and said width W has the same unit as said d.

2. A laser irradiating apparatus comprising:
   a first cylindrical lens group including a plurality of constituent lenses each having a width W for dividing a laser beam into N(n−1) sections along a width direction of the laser beam;
   a second cylindrical lens group for dividing the laser beam into (2n+1) sections along a longitudinal direction of the laser beam;
   a parallelogram first cylindrical lens having an angle X defined by $|\tan X|=W/(d/(n-1))$ for re-coupling the laser beam divided along the longitudinal direction; and
   a second cylindrical lens group for re-coupling the laser beam divided along the width direction;
   wherein said d is defined as an interval of peaks of interference stripes formed on a plane on which the laser beam is irradiated which passes through one constituent lens of the first cylindrical lens group that divides the laser beam in said width direction, and
   wherein said N is a natural number, said n is a natural number of 3 or more, said angle X is not a right angle, and said width W has the same unit as said d.

3. A laser irradiating apparatus comprising:
   a first cylindrical lens group including a plurality of constituent lenses each having a width W for dividing a laser beam into N(n−1) sections along a width direction of the laser beam;
   a parallelogram second cylindrical lens group having an angle X defined by $|\tan X|=W/(d/(n-1))$ for dividing the laser beam into (2n) sections along a longitudinal direction of the laser beam;
   a parallelogram first cylindrical lens having the angle X defined by $|\tan X|=W/(d/(n-1))$ for re-coupling the laser beam divided along the longitudinal direction; and
   a second cylindrical lens group for re-coupling the laser beam divided along the width direction;
   wherein said d is defined as an interval of peaks of interference stripes formed on a plane on which the laser beam is irradiated which passes through one constituent lens of the first cylindrical lens group that divides the laser beam in said width direction, and
   wherein said N is a natural number, said n is a natural number of 3 or more, said angle X is not a right angle, and said width W has the same unit as said d.

4. A laser irradiating apparatus comprising:
   a first cylindrical lens group including a plurality of constituent lenses each having a width W for dividing a laser beam into N(n−1) sections along a width direction of the laser beam;
   a second cylindrical lens group for dividing the laser beam into (2n) sections along a longitudinal direction of the laser beam;
   a parallelogram first cylindrical lens having an angle X defined by $|\tan X|=W/(d/(n-1))$ for re-coupling the laser beam divided along the longitudinal direction; and
   a second cylindrical lens group for re-coupling the laser beam divided along the width direction;
   wherein said d is defined as an interval of peaks of stripes formed on a plane on which the laser beam is irradiated which passes through one constituent lens of the first cylindrical lens group that divides the laser beam in said width direction, and
   wherein said N is a natural number, said n is a natural number of 3 or more, said angle X is not a right angle, and said width W has the same unit as said d.

5. A laser irradiating apparatus comprising:
   means for generating a laser beam;
   a beam homogenizer including an optical system comprising:
      a first cylindrical lens group including a plurality of constituent lenses each having a width W for dividing the laser beam into N(n−1) sections along a width direction of the laser beam;
      a parallelogram second cylindrical lens group having an angle X defined by $|\tan X|=W/(d/(n-1))$ for dividing the laser beam into (2n+1) sections along a longitudinal direction of the laser beam;

a parallelogram first cylindrical lens having an angle X defined by $|\tan X|=W/(d/(n-1))$ for re-coupling the laser beam divided along the longitudinal direction; and a second cylindrical lens for re-coupling the laser beam divided along the width direction; and a moving stage movable in one direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

6. A laser irradiating apparatus comprising:

means for generating a laser beam;

a beam homogenizer including an optical system comprising:

a first cylindrical lens group including a plurality of constituent lenses each having a width W for dividing the laser beam into N(n−1) sections along a width direction of the laser beam;

a second cylindrical lens group for dividing the laser beam into (2n+1) sections along a longitudinal direction of the laser beam;

a parallelogram first cylindrical lens having an angle X defined by $|\tan X|=W/(d/(n-1))$ for re-coupling the laser beam divided along the longitudinal direction; and a second cylindrical lens group for re-coupling the laser beam divided along the width direction; and a moving stage movable in one direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

7. A laser irradiating apparatus comprising:

means for generating a laser beam;

a beam homogenizer including an optical system comprising:

a first cylindrical lens group including a plurality of constituent lenses each having a width W for dividing the laser beam into N(n−1) sections along a width direction of the laser beam;

a parallelogram second cylindrical lens group having an angle X defined by $|\tan X|=W/(d/(n-1))$ for dividing the laser beam into (2n) sections along a-longitudinal direction of the laser beam;

a parallelogram first cylindrical lens having an angle X defined by $|\tan X|=W/(d/(n-1))$ for re-coupling the laser beam divided along the longitudinal direction; and a second cylindrical lens group for re-coupling the laser beam divided along the width direction; and a moving stage movable in one direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

8. A laser irradiating apparatus comprising:

means for generating a laser beam;

a beam homogenizer including an optical system comprising:

a first cylindrical lens group including a plurality of constituent lenses each having a width W for dividing a laser beam into N(n−1) sections along a width direction of the laser beam;

a second cylindrical lens group for dividing the laser beam into (2n) sections along a longitudinal direction of the laser beam;

a parallelogram first cylindrical lens having an angle X defined by $|\tan X|=W/(d/(n-1))$ for re-coupling the laser beam divided along the longitudinal direction; and a second cylindrical lens for re-coupling the laser beam divided along the width direction; and a moving stage movable in one direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

9. An apparatus according to any one of claims 1 through 8, wherein said d is expressed by $\lambda f/L$, wherein:

said $\lambda$ is a wavelength of the laser beam and has the same unit as said d, said f is a focal length of the parallelogram first cylindrical lens that re-couples the laser beam divided along the longitudinal direction, and said L is a width of one constituent lens of the second cylindrical lens group that divides the laser beam along the longitudinal direction, and said L has the same unit as said f.

10. An apparatus according to any one of claims 1 to 8, wherein the laser beam on a plane to be irradiated is a linear beam whose longitudinal length is longer than a cross length thereof.

11. An apparatus according to any one of claims 1 to 8, wherein the laser beam is an excimer laser.

12. An apparatus according to any one of claims 5 to 8, wherein the moving stage is variable in its moving direction.

13. A laser irradiating method characterized by irradiating a laser beam on a plane to be irradiated through an optical system at least comprising:

a first cylindrical lens group including a plurality of constituent lenses each having a width W for dividing a laser beam into N(n−1) sections along a width direction of the laser beam;

a parallelogram second cylindrical lens group having an angle X defined by $|\tan X|=W/(d/(n-1))$ for dividing the laser beam into (2n+1) sections along a longitudinal direction of the laser beam;

a parallelogram first cylindrical lens having the angle X defined by $|\tan X|=W/(d/(n-1))$ for re-coupling the laser beam divided along the longitudinal direction; and a second cylindrical lens group for re-coupling the laser beam divided along the width direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

14. A laser irradiating method characterized by irradiating a laser beam on a plane to be irradiated through an optical system at least comprising:

a first cylindrical lens group including a plurality of constituent lenses each having a width W for dividing the laser beam into N(n−1) sections along a width direction of the laser beam;

a second cylindrical lens group for dividing the laser beam into (2n+1) sections along a longitudinal direction of the laser beam;

a parallelogram first cylindrical lens having an angle X defined by |tan X|=W/(d/(n−1)) for re-coupling the laser beam divided along the longitudinal direction; and a second cylindrical lens for re-coupling the laser beam divided along the width direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

15. A laser irradiating method characterized by irradiating a laser beam on a plane to be irradiated through an optical system at least comprising:

a first cylindrical lens group including a plurality of constituent lenses each having a width W for dividing a laser beam into N(n−1) sections along a width direction of the laser beam;

a parallelogram second cylindrical lens group having an angle X defined by |tan X|=W/(d/(n−1)) for dividing the laser beam into (2n) sections along a longitudinal direction of the laser beam;

a parallelogram first cylindrical lens having the angle X defined by |tan X|=W/(d/(n−1)) for re-coupling the laser beam divided along the longitudinal direction; and a second cylindrical lens group for re-coupling the laser beam divided along the width direction;

wherein said d is defined as an interval of peaks of interference stripes formed on a plane on which the laser beam is irradiated which passes through one constituent lens of the first cylindrical lens group that divides the laser light in said width direction, and wherein said N is a natural number, said n is a natural number of 3 or more, said angle X is not a right angle, and said width W has the same unit as said d.

16. A laser irradiating method characterized by irradiating a laser beam on a plane to be irradiated through an optical system at least comprising:

a first cylindrical lens group including a plurality of constituent lenses each having a width W for dividing a laser light into N(n−1) sections along a width direction of the laser beam;

a second cylindrical lens group for dividing the laser beam into (2n) sections along a longitudinal direction of the beam;

a parallelogram first cylindrical lens having an angle X defined by |tan X|=W/(d/(n−1)) for re-coupling the laser beam divided along the longitudinal direction; and a second cylindrical lens for re-coupling the laser beam divided along the width direction;

wherein said d is defined as an interval of peaks of interference stripes formed on a plane on which the laser beam is irradiated which passes through one constituent lens of the first cylindrical lens group that divides the laser beam in said width direction, and wherein said N is a natural number, said n is a natural number of 3 or more, said angle X is not a right angle, and said width W has the same unit as said d.

17. A laser irradiating method according to any one of claims 13 to 16, wherein the laser beam on a plane to be irradiated is a linear beam whose longitudinal length is longer than a cross length thereof.

18. A laser irradiating method according to any one of claims 13 to 16 wherein the laser beam is irradiated onto a semiconductor film.

19. A laser irradiating method according to any one of claims 13 to 16, wherein d is expressed by $\lambda f/L$, wherein:

said $\lambda$ is a wavelength of the laser beam and has the same unit as said d, said f is a focal length of the parallelogram first cylindrical lens that re-couples the laser beam divided along the longitudinal direction, and said L is a width of one constituent lens of the second cylindrical lens group that divides the laser beam along the longitudinal direction, and said L has the same unit as said f.

* * * * *